United States Patent [19]

Davey

[11] 3,927,706
[45] Dec. 23, 1975

[54] MANUFACTURING CEILING TILE

[75] Inventor: John R. Davey, Camp Hill, Pa.

[73] Assignee: Armstrong Cork Company, Lancaster, Pa.

[22] Filed: July 3, 1974

[21] Appl. No.: 485,493

Related U.S. Application Data

[62] Division of Ser. No. 343,932, March 22, 1973, abandoned.

[52] U.S. Cl.............. 144/326 R; 83/418; 83/420; 144/2 R; 144/117 B; 144/134 R; 144/242 R; 144/245 R; 144/245 D; 144/253 B; 144/253 F
[51] Int. Cl.². ............................................ B27C 1/08
[58] Field of Search ............ 144/241, 253 F, 162 R, 144/36, 37, 38, 90 R, 90 B, 91, 116, 117 R, 117 B, 134 R, 134 A, 323, 326 R, 312, 242 R, 242 E, 245 R, 245 A, 245 D; 83/418, 420, 444, 417, 409

[56] References Cited
UNITED STATES PATENTS

| | | | |
|---|---|---|---|
| 399,900 | 3/1889 | Hoyt.......................... | 144/253 B UX |
| 1,022,176 | 4/1912 | Boothby......................... | 144/253 F |
| 1,634,789 | 7/1927 | Melby............................. | 144/241 X |
| 1,758,834 | 5/1930 | Heston et al................. | 144/117 R X |
| 1,801,244 | 4/1931 | Blood.............................. | 144/2 R X |
| 2,525,894 | 10/1950 | Graham.......................... | 144/253 F |
| 2,758,616 | 8/1956 | Miller et al................... | 144/117 B X |
| 2,783,796 | 3/1957 | Patterson ..................... | 144/117 B X |
| 3,323,565 | 6/1967 | Pease ............................. | 144/162 R |
| 3,636,998 | 1/1972 | Sarrail........................ | 144/134 R X |

Primary Examiner—Frank T. Yost
Assistant Examiner—W. D. Bray

[57] ABSTRACT

A ceiling tile is being provided with a patterned surface which must be in registry with the cut edges of the ceiling tile. The pattern is placed on a ceiling tile blank at a predetermined point. This point is then used as a reference point for conveying the ceiling tile past an aligning structure and then a hold-down structure and into an edge detail cutting machine. Two edges of the tile are cut, and then the tile is conveyed at a 90° angle to its original path of travel so that the remaining two edges of the ceiling tile may be cut in registry with the pattern on the ceiling tile.

1 Claim, 2 Drawing Figures

U.S. Patent   Dec. 23, 1975   3,927,706
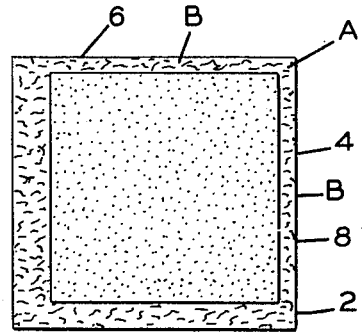
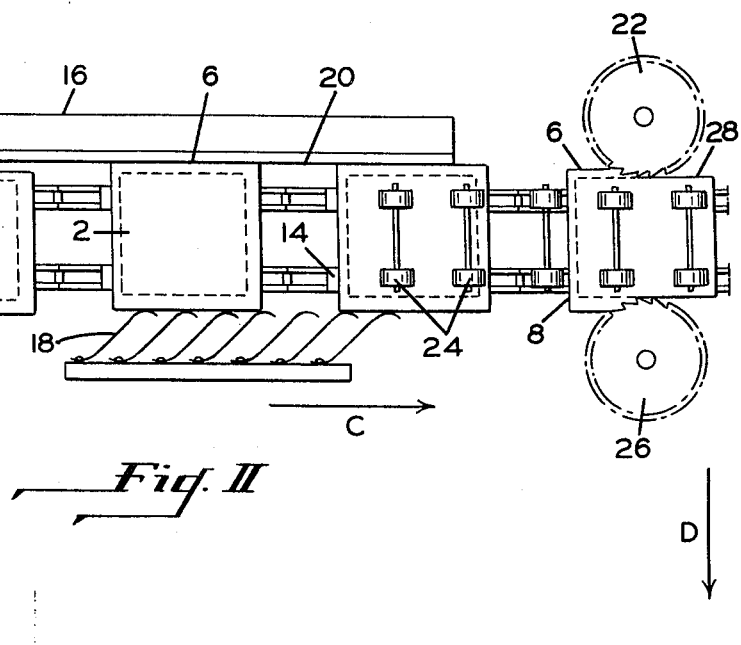

MANUFACTURING CEILING TILE

CROSS-REFERENCE TO RELATED APPLICATION

This is a division of application Ser. No. 343,932, filed Mar. 22, 1973, now abandoned.

BACKGROUND OF THE INVENTION

1. Field of the Invention

The invention herein is a method and apparatus for edge cutting ceiling tile in registry with a pattern on the tile surface.

2. Description of the Prior Art

In the processing of ceiling tiles, the accepted prior practice was to stack tile blanks in a hopper having adequate side clearance to prevent the tiles from binding in the hopper. Chain dogs or lugs would slice or pull the bottom tile from the hopper and transport it into the hold-down section of a tenoning machine. The hopper was simply placed relative to the dogs of the conveying structure so that the excess edge material of the tile blank would provide excess material for cutting the edge detail of the tile in the tenoning machine. The tenoning machine would have cutters which would cut the edge detail on the tile edges which extend parallel with the direction of movement of the chain lugs. Sufficient material was provided in the tile blank size to allow for the lateral movement of the tile blank as it leaves the hopper and approaches the hold-down section. Guide bars prevented excess lateral movement of the tile beyond one-eighth inch. The tile blank was guided to the tenoning machine so that there waw sufficient material on either side of the tile to permit the placing of an edge detail on the tile.

In the manufacture of ceiling products requiring close registration (± 1/64 inch) of an embossed, printed, or other face design, it is required that the tile blanks from the preceding embossing, printing, or similar operation be closely indexed to the tenoning operation so that the edge detail cut thereon will be related to the design placed upon the tile face.

SUMMARY OF THE INVENTION

The invention herein contemplates the positioning of the face design on the tile blank at a certain relationship to one corner of the tile blank. This corner relationship is then placed relative to an aligning structure. The aligning structure will consist of guides which will align the tile and its particular indexing corner relative to the tenoning cutters so that the hold-down section of the tenoning machine would hold the tile in a certain fixed relationship to the design placed upon the tile surface. The tenoning machine can then cut the edge detail on the tile blanks relative to the tile face design. Specifically, the aligning is carried out by the use of a conveyor structure which pushes the tile in one direction while an aligning apparatus pushes the tile in a traverse direction to align the index corner of the tile relative to a guide structure which, in turn, is in proper alignment with the cutters of the tenoning machine.

Since the pattern of the tile has been previously registered to a certain tile corner and this is moved relative to the guiding structure and the conveying structure, the tile blanks can be consistently registered to the same reference point. It then follows that the cutters can then be adjusted to consistently cut the desired edge detail on the tile at the exact location required by the design on the face of the tile. A second pass of the tile through a second tenoner set at a 90° angle to the first pass of the tile through the first tenoner is carried out. The second tenoner is similarly equipped to the first tenoner so as to provide the appropriate edge detail on the remaining two edges of ceiling tile.

BRIEF DESCRIPTION OF THE DRAWING

FIG. I is a top view of a ceiling tile with a design thereon; and

FIG. II is a top schematic representation of the alignment apparatus and tenoner of the invention herein.

DESCRIPTION OF THE PREFERRED EMBODIMENT

In FIG. I there is shown a ceiling tile blank 2 which is made to a nominal 13 inches by 13 inches square. This blank is to be cut to the conventional nominal 12 inch square finished ceiling tile size. On the ceiling tile blank, there is provided a pattern 4 which may be printed or embossed thereon. This pattern is placed relative to corner A of the tile blank 2 with the same set distance B from edges 6 and 8 of the tile blank. The tile blank 2 is then placed in a conventional hopper structure 3 with the pattern 4 facing downward. Tile is normally stacked in a hopper and stripped from the hopper by a conveyor structure 10. However, the tile could just as soon be placed upon a conventional conveyor structure by any conventional means.

The conveyor structure 10 shown in a dual chain structure 12, the chain of which has a plurality of dogs or lugs 14 thereon. These lugs are in engagement with the edge 8 of the tile blank 2. The lugs push the tile blank towards a tenoning machine in the direction C. The edge 6 of the tile blank moves parallel with the direction C while the edge 8 of the tile blank is positioned at a 90° angle from the direction C.

As the tile blank 2 passes towards the tenoner, it passes by a fixed guide structure 16 along which edge 6 is designed to be indexed and slid therealong. A plurality of spring fingers 18 act upon the edge of the tile blank 2 opposite from the edge 6 and force the edge 6 of the tile blank up against the fixed guide 16. The edge 20 of the guide extends parallel with the direction of travel of the tile blank. The edge 20 of the fixed guide 16 guides edge 6 of the tile blank, and these edges are positioned relative to cutter 22 of the tenoner.

A plurality of hold-down rollers 24 of the tenoner engage the tile blank and hold it snugly against the conveyor structure 10 while the lugs or dogs 14 continue to push the tile blank towards the tenoner. The second cutter 26 of the tenoner is spaced from the first cutter of the tenoner to give the desired width to the ceiling tile. If the ceiling tile were simply to be cut to a square edge configuration, the two tenoners would have their cutting edges spaced 12 inches apart. The cutting edge of cutter 22 is so positioned relative to guide edge 20 that it will cut along edge 6 of the tile blank 2 to place the cut edge 28 thereon in a certain fixed position relative to the edge of the printed design 4 which was placed upon the face of the tile blank 2. As was previously described, the printed design is put in a set position relative to edges 6 and 8 and is obviously placed relative to these edges so that the edge of the design 4 is parallel to the edges 6 and 8. Naturally, the tenoner could just as soon put a simple kerf in the board or could put a tongue and groove edge structure on the board. Regardless of the edge configuration provided, the important thing is that the finished edge of the tile be cut relative to the design on the face of the tile blank 2.

After the tile blank passes the first-pass tenoner, it then is moved in a direction D which is a path of travel at a 90° angle to the first direction of travel C. A second edge guide is then used to guide the edge 8 of the ceiling tile relative to another fixed guide which is then positioned relative to the cutters of a second tenoner to then cut the edge 8 and its opposite edge in a certain fixed position relative to the pattern on the face of the ceiling tile. This is accomplished because, as was previously indicated, the edge 8 of the ceiling tile has a fixed relationship to the edge of the printed pattern 4. After the product has passed through the second tenoner, it will then have its four edges cut relative to the pattern on the tile blank and will be cut to the desired size with the desired edge configuration.

What is claimed is:

1. The method for cutting the edge of an oversize board structure in a fixed relationship to a pattern on the surface thereof to form a ceiling tile, said board being oversize relative to the pattern placed on the board, said oversize board structure having a pattern on the surface thereof with the pattern placed at a certain fixed distance and parallel to a first edge of the oversize board and said pattern being placed on the oversize board structure relative to and parallel to a second edge of the oversize board structure, said second edge being at a 90° angle to said first board edge, the method comprising the steps of:

a. conveying the oversize board towards an edge-cutting means;

b. forcing said first edge of the board against a first fixed guide means so as to guide the first edge relative to the first fixed guide means;

c. holding the board relative to the means conveying the board once the board has established its relationship to the first fixed guide;

d. positioning the cutter structure of a first edgecutting means relative to the fixed guide so that, when the board structure passes from the fixed guide to the cutter structure, the cutter structure will cut the first edge of the board structure in a fixed relationship to the pattern on the board structure;

1. said cutter structure being composed of two cutting means which are spaced apart the distance desired for the width of the finished board and said first cutting means being positioned relative to the fixed guide so as to cut the edge of the board structure while said second cutting means is positioned relative to said first cutting means to cut the board to the desired width;

e. passing the oversize board structure adjacent a second fixed guide means and forcing said second edge of the board against the second fixed guide means so as to guide that edge relative to the fixed guide means, and f. positioning a cutter structure of a second edgecutting means relative to the fixed guide so that, when the board structure passes from the second fixed guide means to the cutter structure, the cutter structure will cut the remaining two edges of the oversize board with said second certain edge being cut relative to the edge of the pattern on the board.

* * * * *